10

(12) United States Patent
Cosatto et al.

(10) Patent No.: US 8,774,518 B2
(45) Date of Patent: Jul. 8, 2014

(54) DIGITAL PATHOLOGY SYSTEM WITH LOW-LATENCY ANALYTICS

(75) Inventors: Eric Cosatto, Red Bank, NJ (US); Christopher Malon, Fort Lee, NJ (US); Hans P. Graf, Lincroft, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 146 days.

(21) Appl. No.: 13/564,437

(22) Filed: Aug. 1, 2012

(65) Prior Publication Data

US 2013/0034304 A1     Feb. 7, 2013

Related U.S. Application Data

(60) Provisional application No. 61/514,143, filed on Aug. 2, 2011, provisional application No. 61/514,144, filed on Aug. 2, 2011, provisional application No. 61/514,146, filed on Aug. 2, 2011.

(51) Int. Cl.
*G06K 9/46* (2006.01)
*G06K 9/66* (2006.01)
*G06K 9/00* (2006.01)

(52) U.S. Cl.
CPC .................................. *G06K 9/00979* (2013.01)
USPC ........................................... 382/190; 382/173

(58) Field of Classification Search
USPC .................... 382/128, 133, 173, 190
See application file for complete search history.

(56) References Cited

U.S. PATENT DOCUMENTS

| | | |
|---|---|---|
| 6,711,283 B1 | 3/2004 | Soenksen |
| 6,917,696 B2 | 7/2005 | Soenksen |
| 7,035,478 B2 | 4/2006 | Crandall et al. |
| 7,116,440 B2 | 10/2006 | Eichhorn et al. |
| 7,251,363 B2 * | 7/2007 | Priddy ........................... 382/173 |
| 7,257,268 B2 | 8/2007 | Eichhorn et al. |
| 7,428,324 B2 | 9/2008 | Crandall et al. |
| 7,457,446 B2 | 11/2008 | Soenksen |
| 7,463,761 B2 | 12/2008 | Eichhorn et al. |
| 7,502,519 B2 | 3/2009 | Eichhorn et al. |
| 7,518,652 B2 | 4/2009 | Olson et al. |
| 7,542,596 B2 | 6/2009 | Bacus et al. |
| 7,602,524 B2 | 10/2009 | Eichhorn et al. |
| 7,646,495 B2 | 1/2010 | Olsen et al. |
| 7,668,362 B2 | 2/2010 | Olson et al. |
| 7,689,024 B2 | 3/2010 | Eichhorn et al. |
| 7,738,688 B2 | 6/2010 | Eichhorn et al. |
| 7,756,309 B2 | 7/2010 | Gholap et al. |
| 7,760,927 B2 | 7/2010 | Gholap et al. |
| 7,787,674 B2 | 8/2010 | Eichhorn |
| 7,826,649 B2 | 11/2010 | Crandall et al. |
| 7,844,125 B2 | 11/2010 | Eichhorn et al. |
| 7,860,292 B2 | 12/2010 | Eichhorn et al. |
| 7,893,988 B2 | 2/2011 | Olson et al. |
| 7,949,168 B2 | 5/2011 | Crandall et al. |

(Continued)

*Primary Examiner* — Gregory M Desire

(74) *Attorney, Agent, or Firm* — Joseph Kolodka; Akitaka Kimura

(57) ABSTRACT

Methods and systems for digital pathology with low-latency analytics include determining potential regions of interest within an image in accordance with one or more high-priority analyses, dividing the potential regions of interest into a plurality of sub-sections optimized for parallel computation, analyzing the sub-sections using one or more execution nodes, each including one or more processors, using a copy of the image stored in a shared memory according to the one or more high-priority analyses, and storing an intermediate analysis result based on analysis results from the one or more execution nodes in a shared memory.

18 Claims, 5 Drawing Sheets

(56) References Cited

U.S. PATENT DOCUMENTS

| | | | |
|---|---|---|---|
| 8,077,959 B2* | 12/2011 | Dekel et al. | 382/133 |
| 8,199,988 B2* | 6/2012 | Marshall et al. | 382/128 |
| 8,296,359 B2* | 10/2012 | Tahan | 709/203 |
| 8,549,066 B1* | 10/2013 | Donahue et al. | 709/203 |
| 2005/0136509 A1 | 6/2005 | Gholap et al. | |
| 2005/0136549 A1 | 6/2005 | Gholap et al. | |
| 2005/0265588 A1 | 12/2005 | Gholap et al. | |
| 2005/0266395 A1 | 12/2005 | Gholap et al. | |
| 2006/0014238 A1 | 1/2006 | Gholap et al. | |
| 2006/0015262 A1 | 1/2006 | Gholap et al. | |
| 2006/0026111 A1 | 2/2006 | Athelogou et al. | |
| 2006/0195407 A1 | 8/2006 | Athelogou et al. | |
| 2007/0019854 A1 | 1/2007 | Gholap et al. | |
| 2007/0036440 A1 | 2/2007 | Schaepe et al. | |
| 2007/0112823 A1 | 5/2007 | Baatz et al. | |
| 2007/0122017 A1 | 5/2007 | Binnig et al. | |
| 2007/0147673 A1 | 6/2007 | Crandall | |
| 2008/0008349 A1 | 1/2008 | Binnig et al. | |
| 2008/0065645 A1 | 3/2008 | Eichhorn | |
| 2008/0124002 A1 | 5/2008 | Eichhorn | |
| 2008/0137937 A1 | 6/2008 | Athelogou et al. | |
| 2008/0240613 A1 | 10/2008 | Dietz et al. | |
| 2008/0273788 A1 | 11/2008 | Soenksen et al. | |
| 2008/0292153 A1 | 11/2008 | Binnig et al. | |
| 2008/0292159 A1 | 11/2008 | Soenksen et al. | |
| 2008/0304722 A1 | 12/2008 | Soenksen | |
| 2008/0313691 A1* | 12/2008 | Cholas et al. | 725/131 |
| 2009/0087051 A1* | 4/2009 | Soenksen et al. | 382/128 |
| 2009/0141126 A1 | 6/2009 | Soenksen | |
| 2009/0208134 A1 | 8/2009 | Eichhorn et al. | |
| 2009/0231689 A1 | 9/2009 | Pittsyn et al. | |
| 2009/0241060 A1 | 9/2009 | Schmidt et al. | |
| 2010/0141753 A1 | 6/2010 | Olson et al. | |
| 2010/0226926 A1 | 9/2010 | Loney et al. | |
| 2010/0260407 A1 | 10/2010 | Eichhorn et al. | |
| 2010/0265267 A1 | 10/2010 | Schaepe et al. | |
| 2010/0321387 A1 | 12/2010 | Eichhorn | |
| 2011/0037847 A1 | 2/2011 | Soenksen | |
| 2011/0047502 A1 | 2/2011 | Schmidt et al. | |
| 2011/0060766 A1* | 3/2011 | Ehlke et al. | 707/802 |
| 2011/0090223 A1 | 4/2011 | Eichhorn et al. | |
| 2011/0111435 A1* | 5/2011 | Dobson et al. | 435/7.23 |
| 2011/0115897 A1 | 5/2011 | Najmabadi et al. | |
| 2011/0141263 A1 | 6/2011 | Olson et al. | |
| 2012/0014587 A1* | 1/2012 | Yamane | 382/133 |
| 2012/0092476 A1* | 4/2012 | Diamant et al. | 348/79 |
| 2012/0127297 A1* | 5/2012 | Baxi et al. | 348/79 |
| 2013/0034304 A1* | 2/2013 | Cosatto et al. | 382/190 |

* cited by examiner

DIGITAL PATHOLOGY SYSTEM WITH LOW-LATENCY ANALYTICS

RELATED APPLICATION INFORMATION

This application claims priority to provisional application Ser. No. 61/514,143, filed on Aug. 2, 2011, to provisional application Ser. No. 61/514,144, filed Aug. 2, 2011, and to provisional application Ser. No. 61/514,146, filed Aug. 2, 2011, each incorporated herein by reference. This application is related to application Ser. No. 13/564,418, entitled, "INTERACTIVE ANALYTICS OF DIGITAL HISTOLOGY SLIDES," filed concurrently herewith and incorporated herein by reference. This application is related to application Ser. No. 13/564,453, entitled, "CLOUD-BASED DIGITAL PATHOLOGY," filed concurrently herewith and incorporated herein by reference.

BACKGROUND

1. Technical Field

The present invention relates to digital pathology and, more particularly, to image analysis performed with whole-slide imaging.

2. Description of the Related Art

Pathologists and medical doctors analyze very large digital images of whole histopathology slides using whole-slide imaging browsers. Such browsers form a kind of virtual microscope running on a computer, allowing a user to manipulate the image in a user-friendly fashion, e.g., by panning and zooming, and implement computer-based image analysis on the slide. Image analysis normally operates on a portion of the image, called the region of interest (ROI), but the size of the ROI is often constrained by the complexity of the analysis and the available computing resources. Analytics on histopathological images, including image processing, image analysis, and machine learning, is frequently computationally intensive and cannot be performed in an interactive way.

Existing systems are desktop or web-browser based and perform viewing and limited analysis. These systems do not have the capability of executing full analysis of tissues. As a result, analysis on such systems is not scalable, and demanding functions take too long for interactive execution.

Furthermore, existing distributed computing systems are inadequate to address the needs of digital pathology, because the computation and communication demands may overwhelm even powerful distributed systems. Images of histology slides can be, for example, several gigabytes in size, such that it is usually infeasible to transfer such images back and forth between client and server. Moreover, the computations involved in modern analytics can be very intensive, particularly if performed on the entire image. As such, existing cloud servers are not optimized to handle digital pathology services.

SUMMARY

A method for preprocessing images for analysis includes determining potential regions of interest within an image in accordance with one or more high-priority analyses; dividing the potential regions of interest into a plurality of sub-sections optimized for parallel computation; analyzing the sub-sections using one or more execution nodes, each including one or more processors, using a copy of the image stored in a shared memory according to the one or more high-priority analyses; and storing an intermediate analysis result based on analysis results from the one or more execution nodes in a shared memory.

A system for preprocessing images for analysis includes an interpretation layer configured to pre-process images to provide intermediate results that can be quickly provided upon a user's request. The interpretation layer includes a shared memory configured to store full images and analysis results; an execution controller configured to determine potential regions of interest within an image in accordance with one or more high-priority analyses, to divide the potential regions of interest into a plurality of sub-sections optimized for parallel computation; and one or more execution nodes, each including one or more processors, configured to analyze the sub-sections using a copy of the image stored in the shared memory according to the one or more high-priority analyses. The results from the one or more execution nodes are combined to form intermediate execution nodes stored in the shared memory.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide a multi-layer system that allows for distributed processing of analytical tasks, allowing users to perform analysis in real-time with a high degree of responsiveness. Processing is separated into a user interface layer that permits a user to interactively view and direct analysis, and an interpretation layer that distributes computation-heavy analysis to a back-end server or servers that have greater computational power than the interface layer. By focusing computational tasks at a place other than the end-user's terminal, the whole-slide imaging (WSI) browser may be implemented on a much smaller device, e.g., a tablet or laptop.

Figure 1:
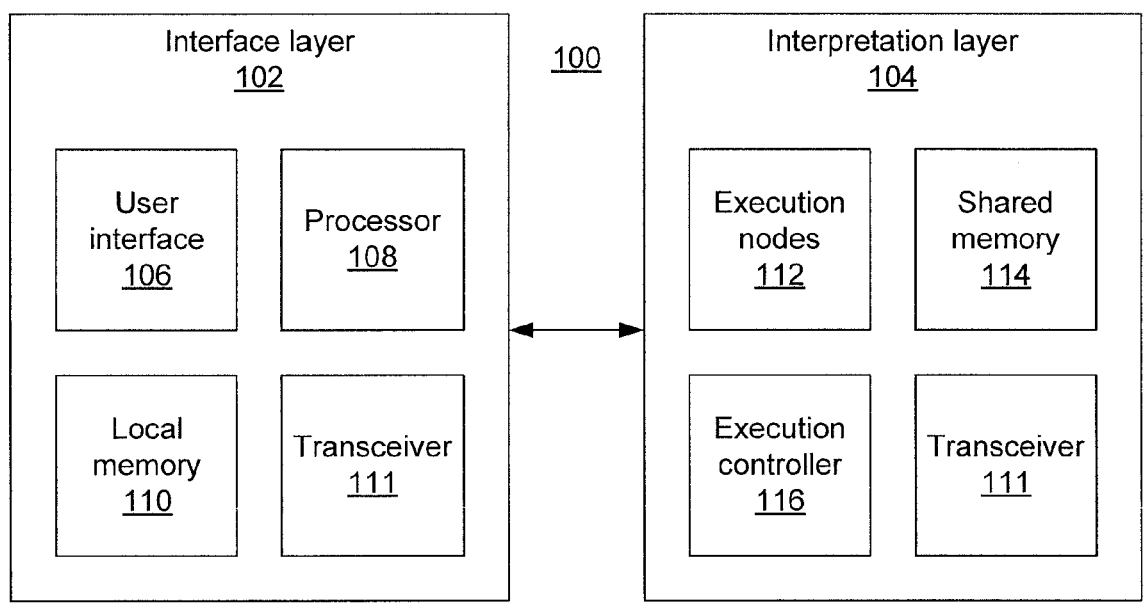
FIG. 1 is a diagram of an interface layer and an interpretation layer for interactive image analytics according to the present principles.

Referring now in detail to the figures in which like numerals represent the same or similar elements and initially to FIG. 1, an analytic system 100 according to the present principles is shown. An interface layer 102 includes a user interface 106, a processor 108, and local memory 110. The user interface 106 may be a graphical user interface that includes a display and one or more input devices. The user interface 106 provides a user with the ability to view and manipulate digital images of, e.g., samples for pathological analysis, said images being stored in local memory 110 or streamed from a shared memory 114. The user interface 106 directs processor 108 to perform local analysis and uses the processor 108 to provide functionality such as panning and zooming in the images. For processes or analyses which are too computationally intensive to be performed in real-time at interface layer 102, requests are sent to interpretation layer 104. Communication between the interface layer 102 and the interpretation layer 104 may be performed over, e.g., the interne, a local area network, or via a wireless connection, using an appropriate network transceiver 111 at each layer.

The interpretation layer 104 may include one or more execution nodes 112. The execution nodes 112 may represent a single computer system with a single processor, having one or more processing cores, or with multiple processors. The execution nodes 112 may also represent multiple distinct computer systems that have been networked in, e.g., a cloud arrangement. The execution nodes 112 have access to a shared memory 114 which stores the image information being used by the interface layer 102. This image information may be communicated by the interface layer 102 or may be stored in advance to minimize communication times and improve responsiveness. An execution controller 116 accepts analysis requests from the interface layer 102 and divides large analyses into multiple sub-jobs, which the execution controller 116 then distributes to execution nodes 112 for analysis. The execution controller 116 includes a scheduler configured to prioritize sub-tasks in such a way as to provide low-latency feedback to the user, optimizing for interactive use. Scheduling may include ordering tasks within a single processing node 112, may include distributing the tasks between processing nodes 112 for parallel execution, or may represent a combination of the two. Different types of runtime schedulers, such as Hadoop®, may be used in execution controller 116 and may be implemented transparently to the user. Upon completion of the analysis by the execution nodes 112, the execution controller assembles the results of the sub-jobs into a single analysis or result and communicates that result back to interface layer 102, where it may be stored and/or displayed to the user.

To obtain good performance, as measured by the subjective delay that the user experiences with the interface layer 102 when requesting analyses, both computational loads and communication loads between the layers are optimized. In one example, a user may use a pointer in user interface 104 to select a portion of an image. The interface layer 102 communicates the selection to the interpretation layer 104, which automatically transforms the freeform region selected by the user into a set of rectangular sections in the image. The number of sections, as well as their size, is optimized to maximize processing speed on the available execution nodes 112 while preserving algorithmic constraints of the selected analytics, such as a minimal resolution needed for proper detection of particular pathological indicators or features. The results of each rectangular section are then filtered, combined, and integrated into a single report at the execution controller 116 and sent to interface layer 102, where the results are displayed as an overlay graphic on the image. The whole process of selecting optimal resolution and of splitting the analysis into sub-jobs takes place transparently, without explicit user direction.

Figure 2:
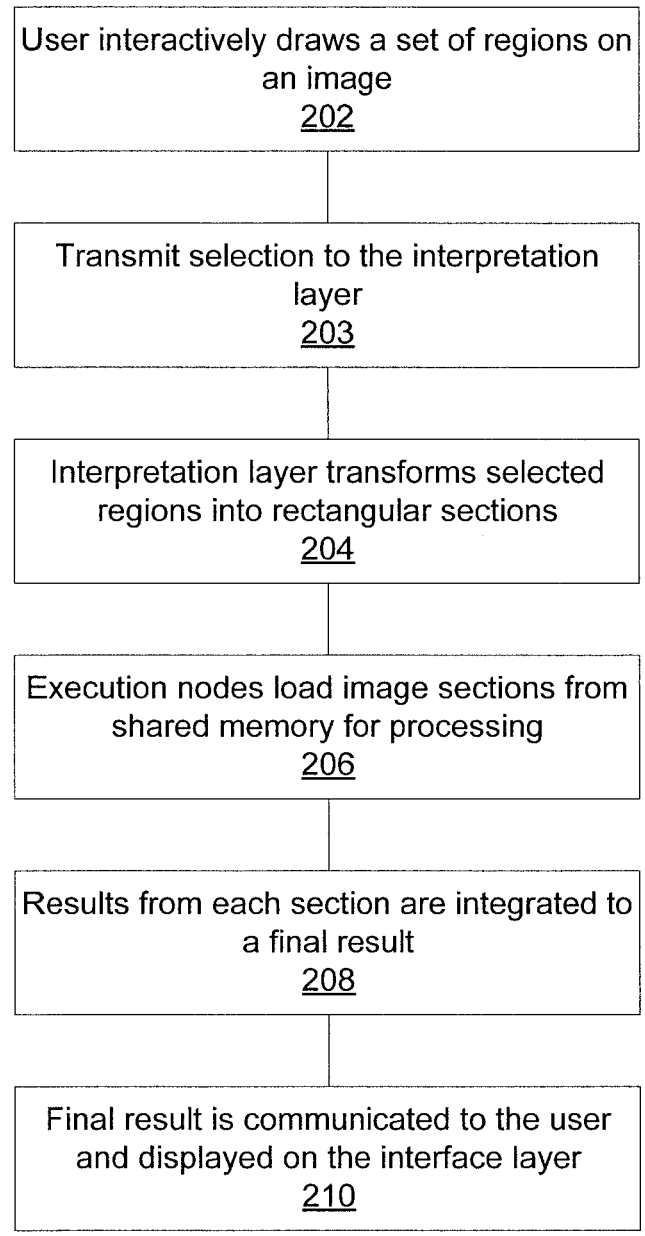
FIG. 2 is a block/flow diagram of a method for interactive image analysis according to the present principles.

Referring now to FIG. 2, a method for whole slide image analysis is shown. At block 202, a user at interface layer 102 interactively selects a set of regions on an image. This may be accomplished using any appropriate input device including, e.g., a mouse pointer used to outline the desired region in a freeform fashion. Block 203 transmits the user's selection and any analysis instructions to the interpretation layer 104, where block 204 transforms the selection region(s) into rectangular sub-sections at an appropriate size and resolution. Block 204 uses execution controller 116 to optimize sub-section size to provide a seamless, interactive experience for the user.

Block 206 transfers the image sub-sections to execution nodes 112 for processing according to a schedule generated by execution controller 116. One exemplary schedule may assign sub-sections to execution nodes 112 as they become available in a round-robin fashion. The execution nodes 112 access image data from shared memory 114 and perform their assigned analyses. The results from each of the execution nodes 112 are collected by block 208 at execution controller 116 to obtain a final result, which is then transmitted to interface layer 102. The result is then stored in local memory 110 and displayed on the user interface 106 as, e.g., an overlay on the original image. This process may be repeated for as many different selections as a user chooses, and for as many types of analysis as are available.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In the same vein as above, the user experience can be further optimized by pre-processing images. For example, pre-processing may include applying the most time-consuming types of analysis to an entire slide. In situations where computational resources for pre-processing are limited, the system may prioritize those portions of an image that are more likely to be of interest to the user, determined using a trained classifier that is trained using a large set of training images which include exemplary selections of regions of interest for particular types of analysis. Alternatively, parts of an image to be pre-processed may be selected by a human technician. Each type of analysis may have its own region of interest, as each image analysis will be looking for different things within the image. The results of pre-processing may be stored in shared memory 114 or transferred to the local memory 110 with the image itself.

When a user requests analysis from user interface 106, cached intermediate results are recalled and only the final analysis, which may involve parameters chosen by the final user, is performed in real-time. Because the most computationally intensive steps have been performed in pre-processing, the final computation is usually much less complex and low-latency. The user interface 106 may indicate regions of the image that are pre-processed by, e.g., overlaying a semi-transparent colored grid on the image. In this way, the user may place a request knowing whether the operation will complete quickly (if the selection is in a pre-processed region) or will take additional time to compute (if some parts of the selection fall outside the pre-processed region). It should be recognized that the "grid" need not be a square or rectangular grid. The grid may instead have corners that do not align, sections that are of varying size and shape, and sections which overlap.

Figure 3:
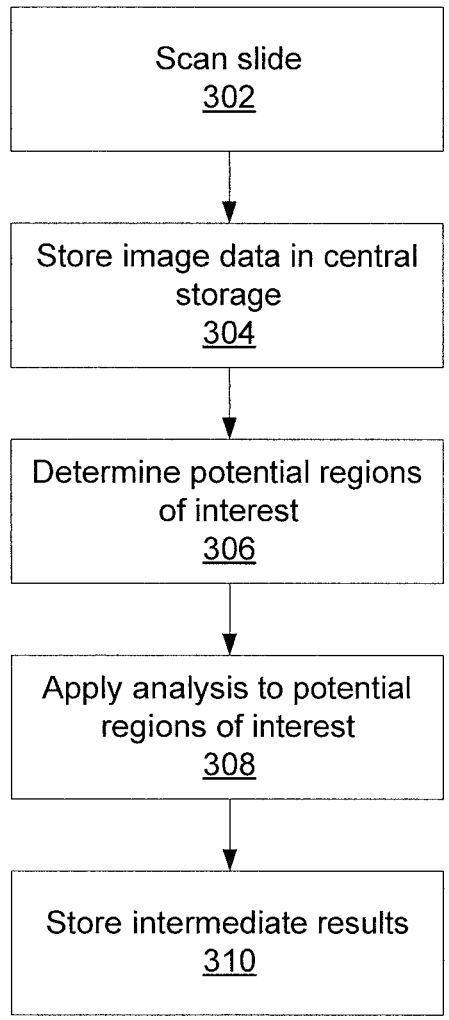
FIG. 3 is a block/flow diagram of a method for pre-processing images according to the present principles.

Referring now to FIG. 3, a method for pre-processing an image is shown. A slide is taken and imaged in block 302. In one exemplary embodiment, hospitals and histology labs may physically ship prepared glass slides to the service provider, which scans the slides into files and then returns the slides to the customer. Although it is specifically contemplated that such slides will include, e.g., a tissue sample or other type of slide used in the diagnosis of disease, it should be recognized that the present principles apply to image manipulation and analysis for any purpose. Block 304 stores the image data in a central storage or shared memory 114. This storage 114 is accessible to execution nodes 112 and may be replicated or split between the execution nodes 112 according to determinations made by execution controller 116.

Execution controller 116 determines potential regions of interest at block 306. This may include segmenting the image into discrete sections and may further include performing an initial analysis on the image to locate potions of the image that may be of particular interest when performing one or more of the available types of analysis. For example, the execution controller may predict a region of interest by noting changes of color, texture, or brightness within the image that would signify changes of tissue type. In one embodiment, potential regions of interest may be selected offline by a technician.

Having determined potential regions of interest, the execution controller 116 may pass information regarding said regions on to execution nodes 112. The execution nodes 112 apply one or more forms of analysis to the potential region(s) of interest at block 308. Because computational resources may still be limited, priority can be assigned by the execution controller 116 to regions of interest that are particularly noteworthy (judged by, e.g., a likelihood score) and to forms of analysis that are most commonly used. Once the execution nodes 112 produce a result, the result is collected by execution controller 116 and stored in shared memory 114 as an intermediate result. In one example, tumor edges may be located automatically or by a technician by determining an area in an image that shows a highest density of dye. This edge region may subsequently be used for analyses such as performing a mitotic count. In this example, regions close to the edge of the tumor would have the highest priority. If there is additional time, regions of interest within the tumor could be further processed using available resources.

Figure 4:
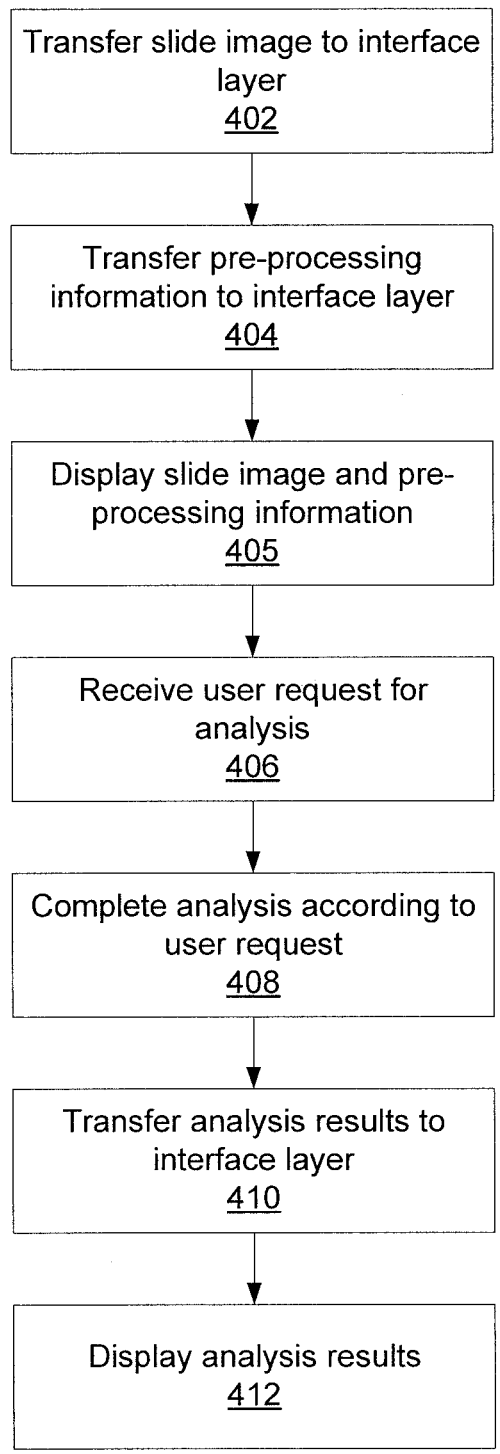
FIG. 4 is a block/flow diagram of a method for interactive image analysis using pre-processed images according to the present principles.

Referring now to FIG. 4, a method for displaying pre-processed images and completing analysis is shown. Block 402 transfers the pre-processed slide image to the interface layer 102, to be stored in local memory 110. The slide image may be transferred on demand from shared memory 114 or may be distributed using physical media using, e.g., a DVD or a flash storage medium. If transferred on demand, to reduce bandwidth burdens, only the portion of the image currently being viewed is transferred, and the interface layer 102 may cache such information locally in local storage 110 to improve performance. The transfer in block 402 may also be performed predictively, where image information is transferred in the background, without user requests, to anticipate potential panning and zooming by the user. This image may represent the original slide image or may have received some formatting during pre-processing. Block 404 transfers pre-processing information from shared memory 114 to the interface layer 102. This information may include, e.g., overlay information for the image to indicate pre-processed regions and types of analysis that can be performed more quickly. Block 405 displays the slide image and optionally also displays pre-processed slide information on the user interface 106. Block 406 then receives a user's request for analysis and transfers that request to the interpretation layer 104.

Having received the user request, block 408 completes the analysis. Toward this end, execution controller 116 accesses intermediate results stored in shared memory 114 and determines what further analysis is needed to meet the user's request. The remaining work is assigned to execution nodes 112 to produce a final analysis. Block 410 transfers the final analysis result from shared memory 114 to the interface layer 102, where block 412 displays the results using the user interface 106. The analysis results may be sent all at once, or may be provided to the interface layer 102 in a progressive fashion, with some results being provided immediately to provide a higher degree of responsiveness to the user.

It should also be noted that state information on the analyses may be preserved in broader contexts. For example, after performing an analysis, the user may request an additional area to be analyzed, or may merely increase or reduce the size of the current area. The state information of any previous analysis may be stored as intermediate results in shared memory 114 and used as a basis for subsequent analyses. Without maintaining a state on both the interface layer 102 and interpretation layer 104, the system would have to recompute initial analyses together with the additional requests. Instead, the present principles maintain the state of analysis and quickly compute only the missing parts, merging them with the current results.

Implementing the present principles greatly increases the speed and responsiveness of WSI browser applications. Not only does the WSI browser gain the speed advantages of parallelism, but pre-processing and communication optimization allow the client to receive analytical information in real-time providing a comfortable level of responsiveness to the user. Furthermore, by offloading analysis to a dedicated offsite service, the up-front cost of analysis is reduced, allowing smaller and less expensive client terminals to be used.

Figure 5:
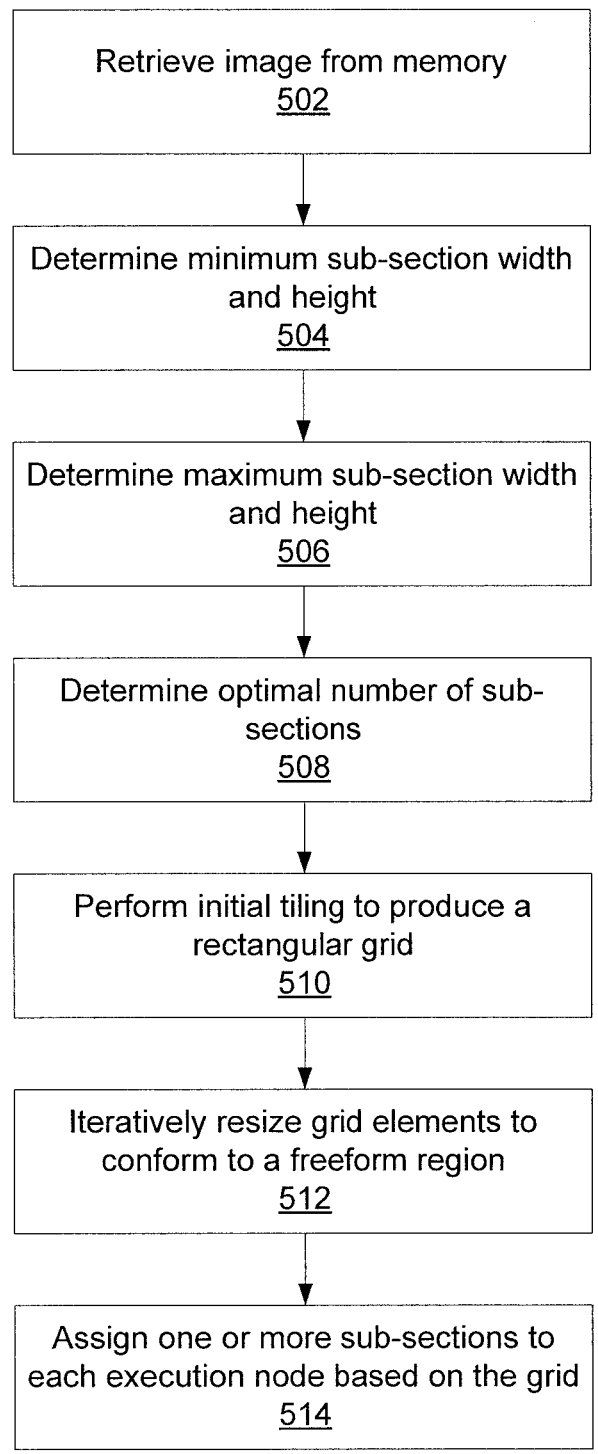
FIG. 5 is a block flow diagram for dividing a region of interest into sub-sections optimized for parallel execution according to the present principles.

Referring now to FIG. 5, a more detailed explanation of the optimization of block 204 is shown in dividing the image into sub-sections for distributed analysis. Block 502 retrieves the image from shared memory 114 and provides it to execution controller 116. Block 504 determines a minimum sub-section height and width based on, e.g., the particular needs of the types of analysis to be applied. For example, a particular type of analysis may have a minimum feature size or may need a minimum amount of information to reach useful conclusions.

Block 506 determines a maximum width and height for the sub-sections. This determination may be made by taking into consideration the system resources available. For example, each execution node 112 may have a local memory of finite size, such that they would not be able to easily handle sub-sections larger than that finite size. Another consideration when determining maximum sub-section size may include determining bandwidth limitations, such that distributing sub-sections beyond a certain size would result in unacceptable delays to the user.

Block 508 determines an optimal number of sub-sections based on, e.g., the number of available execution nodes 112. This number may be, for example, an integer multiple of the number of nodes 112, such that computational resources are used to their fullest. Block 510 performs an initial tiling of the image to produce a rectangular grid that includes, e.g., a user's freeform selection. Block 512 iteratively resizes the grid elements to conform to the freeform region while meeting the above-determined constraints. Resizing grid elements may include removing elements entirely as well as lengthening/widening or shrinking particular grid elements to more closely approximate the selected freeform shape. There is no constraint on the proportion of element width to element height. Having divided the selected region of interest into sub-sections, the execution controller 116 assigns one or more sub-sections to each execution node 112 for analysis.

Having described preferred embodiments of a system and method for digital pathology with low-latency analytics (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for preprocessing images for analysis, the method comprising:
    determining potential regions of interest within an image in accordance with one or more high-priority analyses;
    dividing the potential regions of interest into a plurality of sub-sections optimized for parallel computation;
    analyzing the sub-sections using one or more execution nodes, each including one or more processors, using a copy of the image stored in a shared memory according to the one or more high-priority analyses;
    storing an intermediate analysis result based on analysis results from the one or more execution nodes in a shared memory;
    receiving a selection of a region of the image and a request for analysis of the selection from an interface layer;
    determining what further analysis beyond the intermediate results is needed to meet the request;
    analyzing further sub-sections of the image in accordance with the determination of further needed analysis at the one or more execution nodes;
    combining the intermediate results with the results of the analysis of said further sub-sections to produce final results; and
    transferring said final results to the interface layer.

2. The method of claim 1, wherein results are progressively transferred to the interface layer to provide a user with real-time responses.

3. The method of claim 1, wherein potential regions of interest are determined using a trained classifier that is trained with training images and selections from said training images associated with particular forms of analysis.

4. The method of claim 1, further comprising transferring information regarding the intermediate results to an interface layer.

5. The method of claim 4, wherein said information regarding the intermediate results includes the determined potential regions of interest which underwent analysis for display at the interface layer in conjunction with the image.

6. The method of claim 1, wherein dividing the potential regions of interest comprises:
    determining sub-section size constraints;
    forming an initial rectangular grid; and
    iteratively conforming grid elements to each potential region of interest.

7. The method of claim 6, wherein determining sub-section size constraints comprises determining a minimum width and height based on the request for analysis.

8. The method of claim 6, wherein determining sub-section size constraints comprises determining a maximum width and height based on available system resources.

9. The method of claim 6, wherein iteratively conforming grid elements to the selection includes resizing grid elements in accordance with the determined size constraints.

10. A non-transitory computer readable storage medium comprising a computer readable program, wherein the computer readable program when executed on a computer causes the computer to perform:
    determining potential regions of interest within an image in accordance with one or more high-priority analyses;
    dividing the potential regions of interest into a plurality of sub-sections optimized for parallel computation;
    analyzing the sub-sections using one or more execution nodes, each including one or more processors, using a copy of the image stored in a shared memory according to the one or more high-priority analyses;
    storing an intermediate analysis result based on analysis results from the one or more execution nodes in a shared memory;
    receiving a selection of a region of the image and a request for analysis of the selection from an interface layer;
    determining what further analysis beyond the intermediate results is needed to meet the request;
    analyzing further sub-sections of the image in accordance with the determination of further needed analysis at the one or more execution nodes;
    combining the intermediate results with the results of the analysis of said further sub-sections to produce final results; and
    transferring said final results to the interface layer.

11. A system for preprocessing images for analysis, the system comprising:
    an interpretation layer configured to pre-process images to provide intermediate results that can be quickly provided upon a user's request, said interpretation layer comprising:
    a shared memory configured to store full images and analysis results;
    an execution controller configured to determine potential regions of interest within an image in accordance with one or more high-priority analyses, to divide the potential regions of interest into a plurality of sub-sections optimized for parallel computation; and
    one or more execution nodes, each including one or more processors, configured to analyze the sub-sections using a copy of the image stored in the shared memory according to the one or more high-priority analyses, wherein the results from the one or more execution nodes are combined to form intermediate execution nodes stored in the shared memory, and wherein the interpretation layer is further configured to receive a selection of a region of the image and a request for analysis of the selection from an interface layer, wherein the execution controller is further configured to determine what further analysis beyond the intermediate results is needed to meet the request, and wherein the one or more execution nodes are further configured to analyze further sub-sections of the image in accordance with the determination of further needed analysis at the one or more execution nodes.

12. The system of claim 11, wherein the execution controller is further configured to combine the intermediate results with the results of the analysis of said further sub-sections to produce final results and wherein the interpretation layer is further configured to transferring said final results to the interface layer.

13. The system of claim 11, wherein the interpretation layer is further configured to transfer information regarding the intermediate results to an interface layer.

14. The system of claim 13, wherein said information regarding the intermediate results includes the determined potential regions of interest which underwent analysis for display at the interface layer in conjunction with the image.

15. The system of claim 11, wherein the execution controller is further configured to determine sub-section size constraints, form an initial rectangular grid, and iteratively conform grid elements to the selection to divide the selected region of the image.

16. The system of claim 15, wherein the execution controller is further configured to determine a minimum width and height based on the request for analysis to determine sub-section size constraints.

17. The system of claim 15, wherein the execution controller is further configured to determine a maximum width and height based on available system resources to determine sub-section size constraints.

18. The system of claim 15, wherein the wherein the execution controller is further configured to resize grid elements in accordance with the determined size constraints to conform grid elements to the selection.

* * * * *